United States Patent [19]
Leumer

[11] Patent Number: 5,518,813
[45] Date of Patent: May 21, 1996

[54] POLY (1,4-CYCLOHEXANEDIMETHYLENE TEREPHTHALATE) MULTIFILAMENT YARNS FOR TECHNICAL APPLICATIONS AND PRODUCTION THEREOF

[75] Inventor: Gerhard Leumer, Bobingen, Germany

[73] Assignee: Hoechst Aktinegesellschaft, Germany

[21] Appl. No.: 346,405

[22] Filed: Nov. 29, 1994

[30] Foreign Application Priority Data

Dec. 1, 1993 [DE] Germany .......................... 43 40 869.9

[51] Int. Cl.⁶ .................................................. D02G 3/00
[52] U.S. Cl. ........................... 428/364; 428/395; 528/307
[58] Field of Search ..................................... 428/364, 395; 528/307

[56] References Cited

U.S. PATENT DOCUMENTS

| | | | |
|---|---|---|---|
| 3,669,933 | 6/1972 | King et al. ................................ | 528/307 |
| 3,669,935 | 6/1972 | King et al. ................................ | 528/307 |
| 3,670,489 | 6/1972 | Jackson, Jr. et al. ................... | 528/307 |
| 3,671,495 | 6/1972 | King et al. ................................ | 528/307 |
| 5,169,499 | 8/1992 | Eagles et al. ............................ | 428/175 |

FOREIGN PATENT DOCUMENTS

| | | |
|---|---|---|
| 1222205 | 8/1956 | Germany . |
| 513992 | 5/1970 | Germany . |
| 2814104 | 10/1979 | Germany . |
| 1110752 | 6/1964 | United Kingdom . |
| 1110751 | 4/1968 | United Kingdom . |
| WO90/12918 | 1/1990 | WIPO . |

OTHER PUBLICATIONS

Martin & Busch, Angewnadte Chemie 74 (1962), S. 624–628.
"Therman and Hydrolytic Stability of Kodel Polyester Fiber" (Eastman Testile fibers (1974)).

*Primary Examiner*—N. Edwards
*Attorney, Agent, or Firm*—Connolly & Hutz

[57] ABSTRACT

A high hydrolysis and aminolysis resistance multifilament yarn composed of a polymer based on poly(1,4-cyclohexanedimethylene terephthalate), wherein at least 85 mol % of the diol-derived groups of the polyester are 1,4-cyclohexanedimethylene groups, characterized by a tenacity of above 40 cN/tex, a dry heat shrinkage $S_{200}$ of below 10% and a post hydrolysis or aminolysis treatment strength of at least 85% of the original strength. A process for producing this multifilament yarn comprises maintaining the temperature of the melt at from 295° to 305° C., taking off the filaments at a spinning take-off speed of below 1500 m/min, drawing the spun filaments continuously or batchwise in at least two stages using a defined draw ratio and defined temperatures in every stage, and subjecting the drawn filaments to a setting and relaxing treatment at temperatures above 230° C.

15 Claims, 3 Drawing Sheets

Fig. 3

POLY (1,4-CYCLOHEXANEDIMETHYLENE TEREPHTHALATE) MULTIFILAMENT YARNS FOR TECHNICAL APPLICATIONS AND PRODUCTION THEREOF

BACKGROUND OF THE INVENTION

The present invention relates to poly(1,4-cyclohexanedimethylene terephthalate) multifilament yarns with improved tenacity for technical applications and to the production thereof by spinning filaments having a low crystallite content and subsequent multistage drawing.

For some applications, technical, or industrial, polyester yarns are required to have particularly high resistance to aqueous or basic media. This applies for example to reinforcing threads in rubberized materials such as hoses, conveyor belts, air springs, V-belts and tires, since the vulcanization exposes these materials to an aminolysis or basic hydrolysis. Similarly, with technical polyester fiber materials such as filaments, multifilament yarns, staple fiber yarns or webs, which are envisioned as woven fabric, knitted fabric or in web form for technical applications such as the making of paper making machine cloths and for filter materials where, in use, they come into continuous contact with aqueous, acidic or alkaline solutions and, what is more, may additionally be subject to high sustained mechanical stresses, it is of appreciable importance that the fiber materials retain their strength in the long term under these conditions. The same is true of fiber materials which are used for reinforcing hosing materials, since in this case too they can come into direct contact with aqueous, acidic or basic media.

It is true that the resistance of conventional polyester yarns made of polyethylene terephthalate is sufficient for many technical applications and, what is more, can be enhanced by various measures, for example high molecular weight or carboxyl end group capping, but is at best limited to a residual, post hydrolysis strength of about 60%.

There are in fact polyester materials which possess a distinctly higher resistance to hydrolysis, for example poly(1,4-cyclohexanedimethylene terephthalate), from which there have already been produced monofils which show an excellent resistance to hydrolysis. For instance, WO 90/12918 describes paper making machine cloths composed of poly(1,4-cyclohexanedimethylene terephthalate) monofilaments which show very good resistance to hydrolysis. According to page 7 of this reference, these filaments typically have tenacities within the range from 2.4 to 4.3 g/den, corresponding to 21 to 38 cN/tex, coupled with a dry heat shrinkage $S_{200}$ of from 0.2 to 20.5%. This tenacity, although adequate for use in paper making machine cloths and for textile materials, is not up to the demands which are usually made on fiber materials for technical use, for example in the abovementioned fields.

Whereas the above-cited reference WO 90/12918 describes only the production of monofilaments, German Offenlegungsschrift 2814104 also contains a description of the production of multifilament yarns from poly(1,4-cyclohexanedimethylene terephthalate). According to this reference, the filaments are spun at take-off speeds of above 4000 m/min. The spinning conditions are such that the resulting filaments have a high crystallinity. No information is provided about the conditions under which the fibers are drawn. According to page 15, the filaments thus obtained have tenacities of 18 cN/tex and breaking elongations of 39 or 37%.

British Patents 1,110,751 and 1,110,752 describe tire cords composed of polyesters, especially polyethylene terephthalate but also poly(1,4-cyclohexanedimethylene terephthalate), which are notable for a particularly favorable heat shrinkage, a high aminolysis resistance and low flexing heat evolution. The high initial modulus of fiber materials made of poly(1,4-cyclohexanedimethylene terephthalate) is highlighted in these references; nothing is said in these references about their strength. Nor do these references disclose the spinning and drawing conditions in the production of the tire cord. "Struktur und Eigenschaften einer neuen Polyesterfaser" by E. V. Martin and H. Busch in Angew. Chem. 74 (1962), pages 624 to 628, describes poly (1,4cyclohexanedimethylene terephthalate) fibers, especially the dependence of their physical properties on the conformation of the fundamental structural unit and its crystal structure. Depending on the conditions under which they are produced, these fibers are said to have a tenacity of up to 46.6 cN/tex, albeit at a breaking extension of only 10%. However, the conditions which lead to the production of such fibers are not specified by the authors. The high tenacities reported by Martin and Busch for the fibers described by them do not appear in later sources. "Polyester Fibers other than PET" by J. E. McIntyre (Department of Textile Industries, The University of Leeds, Leeds, UK) reveals that then known poly(1,4cyclohexanedimethylene terephthalate) filaments have breaking strengths of only 18 to 22 cN/tex, which is virtually consonant with the data reported in the 1978filed DE-A-28 14 104. Even somewhat lower tenacity values, namely about 1.4 g/den, corresponding to 12.4 cN/tex, are reported in the technical information document "Thermal and Hydrolytic Stability of (R) KODEL Polyester Fiber" from Eastman Textile Fibers, published in 1974.

For technical applications, the prior art poly(1,4cyclohexanedimethylene terephthalate) filaments thus have the serious disadvantage that they have a relatively low tenacity which, if high strength requirements are to be met, has to be compensated through the use of greater quantities of material.

SUMMARY OF THE INVENTION

It has now been found, surprisingly, that it is possible to make technical multifilament yarns from poly(1,4cyclohexanedimethylene terephthalate) whose textile and mechanical properties are far superior to those of the prior art monofilaments or multifilament fiber materials. And this without sacrificing the excellent resistance of the poly(1,4-cyclohexanedimethylene terephthalate) fibers to hydrolysis and aminolysis.

DETAILED DESCRIPTION OF THE INVENTION

The present invention thus provides a high hydrolysis and aminolysis resistance multifilament yarn composed of a polyester based on poly(1,4-cyclohexanedimethylene terephthalate), wherein at least 85 mol % of the diol-derived groups of the polyester are 1,4-cyclohexanedimethylene groups, characterized by a tenacity of above 40 cN/tex and a post hydrolysis or aminolysis treatment strength of at least 85% of the original strength.

Preferably at least 85 mol % of the structural units of the polyester of the multifilament yarn according to the present invention are 1,4-cyclohexanedimethylene terephthalate groups.

The reported post aminolysis treatment strength values relate to a 48 hour period of immersion of the fiber samples in 5% strength ethylenediamine solution (pH 11.8) at 80° C.

Figure 1:
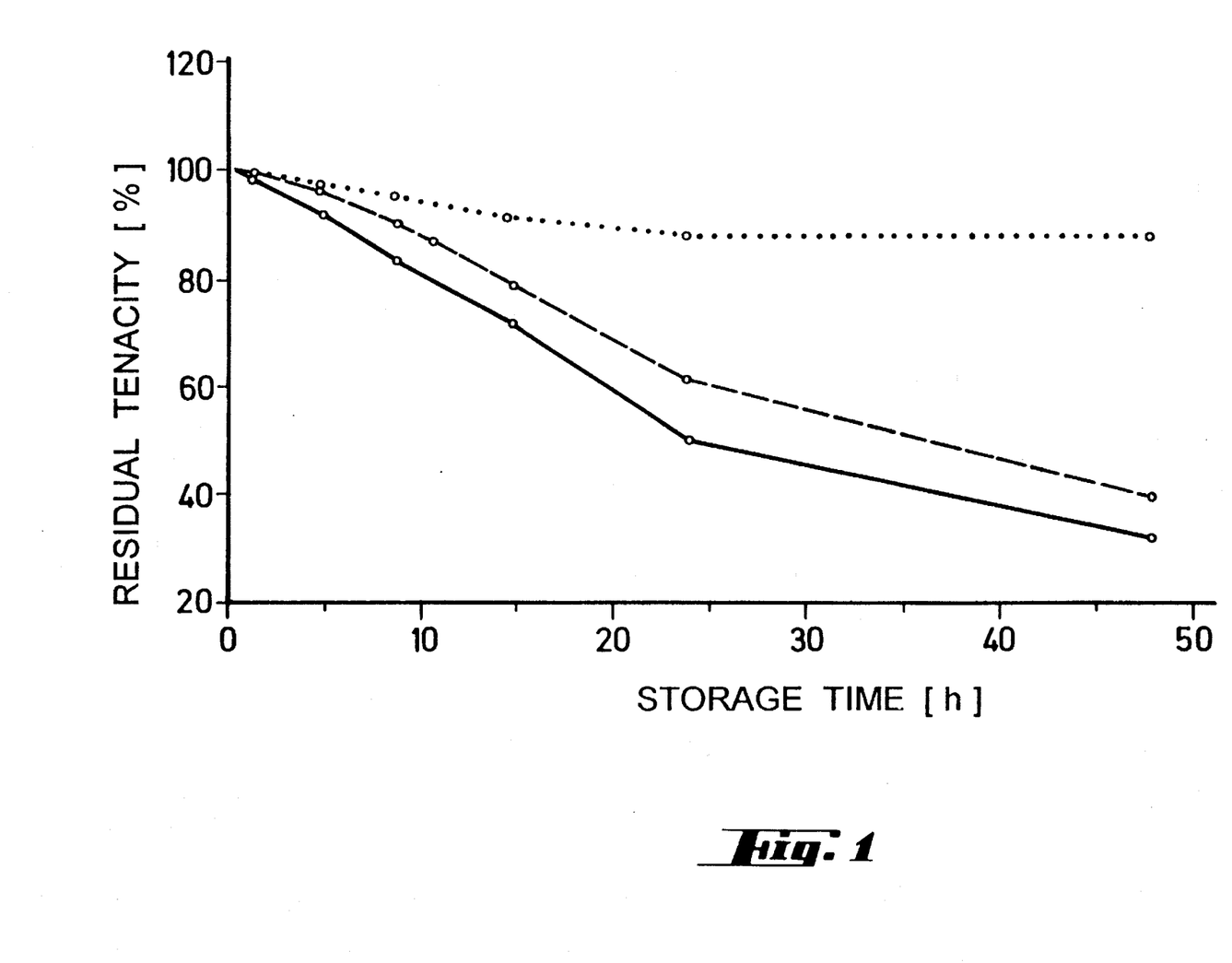
FIGS. 1 and 2 are graphs showing the results of the aminolysis test or of the hydrolysis test respectively, carried out with a) polyethylene terephthalate yarn having a specific viscosity of 1.05 (uninterrupted curve), b) polyethylene terephthalate yarn having a specific viscosity of 1.20 (dashed line curve), and c) multifilament yarns according to the present invention (dotted curve)

The aminolysis test is carried out by introducing undressed threads (1100 dtex x1x2Z/S 420) in the form of hanks wound from the fiber material of the invention into a 5% strength ethylenediamine solution kept at 80° C. in a flask equipped with a reflux condenser and positioned in a temperature controlled water bath. At the end of the desired immersion time, the samples are removed, carefully rinsed with water and dried. Then the strength is tested and expressed as a proportion of the original strength of the samples. The sample immersion time in the ethylenediamine solution is varied between 1 and 48 hours. The measurements obtained are illustrated in FIG. 1.

Figure 2:
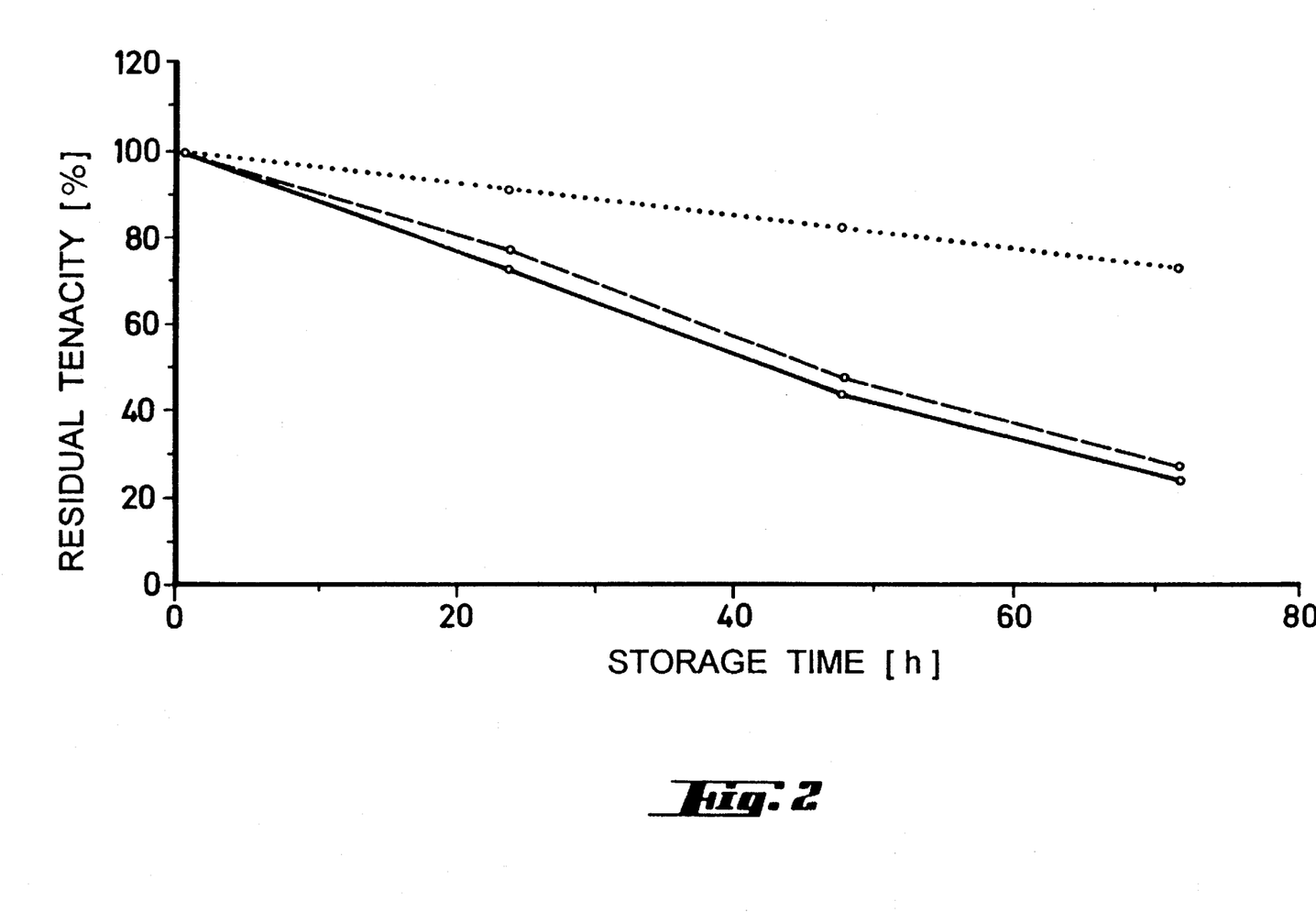

The reported post hydrolysis treatment strength values are based on a 72 hour period of immersion of the polyester filaments in saturated steam at 135° C. The hydrolysis test is carried out by storing specimens of the undressed threads (1100 dtex x1x2Z/S 420) of fiber materials according to the present invention in the form of hanks in a saturated steam atmosphere at 135 At the end of the envisaged storage period, the specimens are dried and their strength is determined. The strength values obtained are expressed as a proportion of the original strength. The hydrolysis resistance values obtained on fiber materials of the present invention for storage times from 20 to 72 hours are illustrated in FIG. 2. For comparison, FIGS. 1 and 2 also show corresponding aminolysis and hydrolysis resistance values of technical polyethylene terephthalate yarns. In the graphs of FIGS. 1 and 2, the values obtained for polyethylene terephthalate yarn having a Specific viscosity of 1.05 are indicated by the uninterrupted curve, the values for polyethylene terephthalate yarn having a specific viscosity of 1.20 are indicated by the dashed line curve, and the values obtained for multifilament yarns according to the present invention are indicated by the dotted curve. The significantly smaller drop in the dotted curve indicates the considerable superiority of the yarns according to the present invention over polyethylene terephthalate yarns as regards aminolysis and hydrolysis resistance.

Depending on the intended use, the yarns of the present invention can be equipped with a combination of particularly useful properties.

A preferred group of yarns according to the present invention has a tenacity of above 40 cN/tex, in particular of above 45 cN/tex, and a dry heat shrinkage $S_{200}$ of below 10%.

A further preferred group of yarns according to the present invention has a tenacity of above 40 cN/tex and a dry heat shrinkage $S_{200}$ of below 5%.

Preference is further given to yarns according to the present invention which have a tenacity of above 50 cN/tex and a dry heat shrinkage $S_{200}$ of above 7%.

Figure 3:
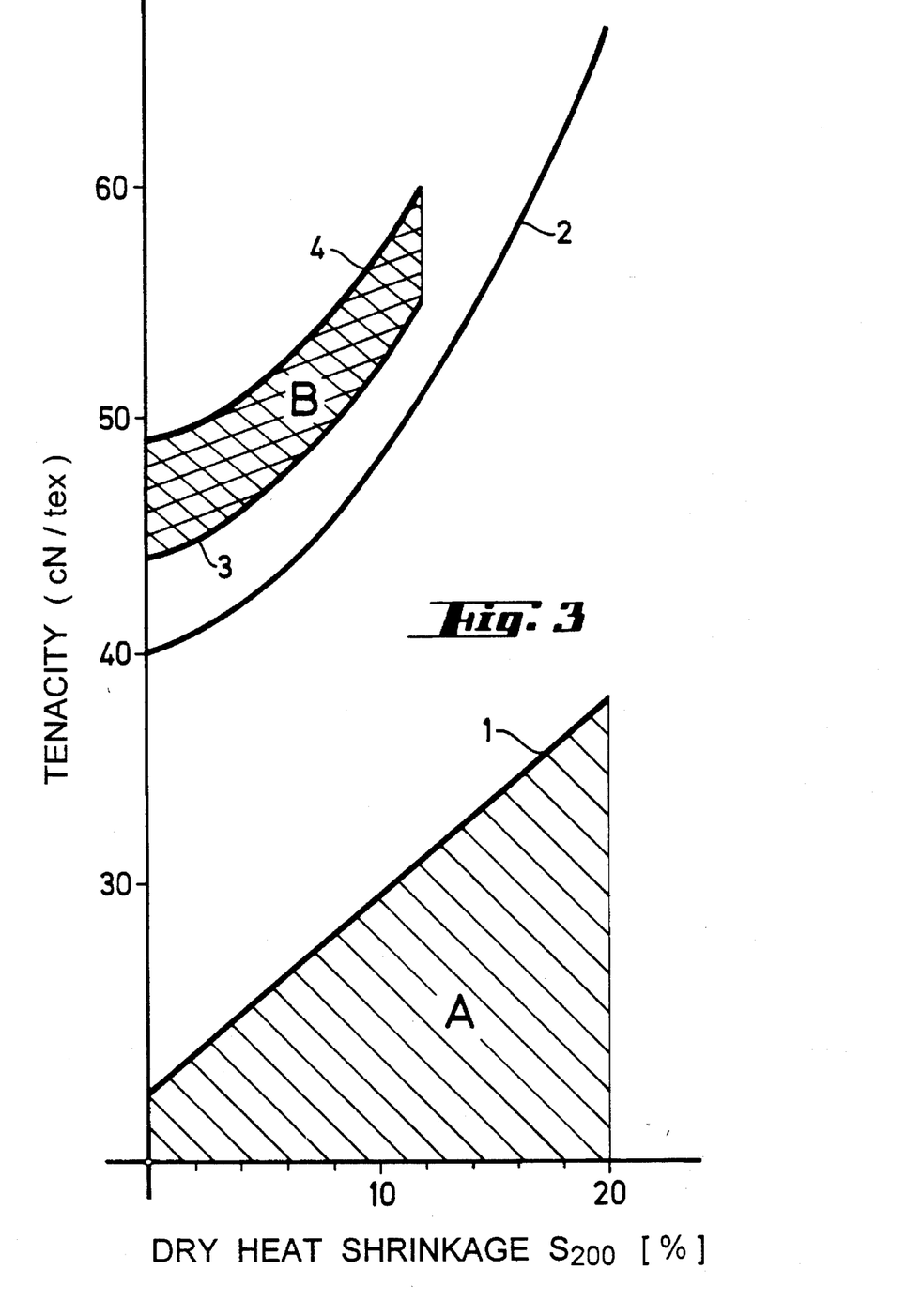
FIG. 3 illustrates in a tenacity/dry heat shrinkage diagram the regions occupied by the poly(1,4-cyclohexadimethylene terephthalate) fiber materials of the prior art and the poly(1, 4cyclohexanedimethylene terephthalate) fiber materials of the present invention.

Particular preference is given to yarns according to the present invention for which the relationship between the tenacity F (in cN/tex) of the yarn and its dry heat shrinkage $S_{200}$ (in %) is given by the equation (1):

$$F = K + 0.267 * S_{200} + 0.054 S_{200}^2 \qquad (1)$$

where the summand K is above 40 (curve 2), preferably 44 (curve 3) to 49 (curve 4), and $S_{200}$ is from 0 to 20, preferably from 0 to 12.

FIG. 3 illustrates in a tenacity/dry heat shrinkage diagram the regions occupied by the poly(1,4-cyclohexanedimethylene terephthalate) fiber materials of the prior art and the poly(1,4-cyclohexanedimethylene terephthalate) fiber materials of the present invention.

The fiber materials disclosed in the period from 1974 to 1989 are disposed in the hatched region A underneath the straight line 1. The multifilament yarns of the present invention are preferably disposed in the region above curve 2, in particular in the crosshatched region B enclosed between curves 3 and 4. The dry heat shrinkage of the multifilament yarns according to the present invention at 200° C. is within the range from 1 to 20%, preferably within the range from 1 to 12%, and the breaking extension is within the range from 5 to 20%, preferably within the range from 10 to 20%. The hot air shrinkage at 200° C. ($S_{200}$) is determined in accordance with DIN 53866 Part 3.

According to this DIN a yarn sample is preconditioned for at least 4 hours and then suspended in a sample carrier. The free hanging samples are subjected to a controlled shrinkage in a forced air oven by a 15 minute treatment with hot air at 200° C. Thereafter the treated sample in allowed to hang free at room temperature for at least 6 hours before measurement.

The multifilament yarns of the present invention are preferably composed of polyesters whose polymer chains contain from 85 to 100 mol % of groups of the formula I and from 15 to 0 mol % of groups of the formula II where X comprises at least 85 mol % of aromatic radicals having from 5 to 16, preferably from 6 to 12, carbon atoms and not more than 15 mol % of aliphatic radicals having from 4 to 10 carbon atoms, preferably from 6 to 8 carbon atoms,

Y comprises at least 85 mol % of 1,4-cyclohexane dimethylene groups and not more than 15 mol % of straight-chain or branched alkanediyl having from 2 to 16, preferably from 2 to 8, carbon atoms, or radicals of the formula —(CH$_2$CHR—O)$_n$—CH$_2$CHR—, where R is methyl or hydrogen and n is an integer from 1 to 40, n=1 or 2 being preferred for proportions up to 15 mol % and groups having n=10 to 40 preferably being present only in proportions of below 5 mol %, or radicals of the formula —(CH$_2$)$_q$—Q—(CH$_2$)$_q$—, where Q is O or S (an oxygen or sulfur atom), and q is an integer from 2 to 8, or Q is cycloalkanediyl or a unicyclic or bicyclic fused or unfused aromatic radical, in particular phenylene, or a radical of the formula III where Z is polymethylene or alkylene having from 1 to 4 carbon atoms, —SO$_2$—, —COO—, —O— or —S—.

The Y 1,4-cyclohexanedimethylene groups of the formula IV have a cis form and a trans form. The 1,4-cyclohexanedimethylene groups of the formula IV present in the polyesters of the multifilament yarns according to the present invention preferably have a trans content of at least 50%, in particular 60%, for example 75%. Accordingly, the maximum proportions of the cis form are preferably 50%, in particular 40%, for example 25%. This cis configuration is according to Martin and Busch (loc. cit.) probably in the boat form of the formula IVa, while the trans configuration is preferentially in the chair conformation of the formula IVb.

Particular preference is given to yarns according to the present invention wherein the polyester is exclusively composed of groups of the formula I in which from 90 to 100 mol %, preferably from 95 to 100 mol %, of the radicals X are p-phenylene radicals and from 0 to 10 mol %, preferably from 0 to 5 mol %, of the radicals X are m-phenylene radicals. Such a polyester raw material which is highly suitable for producing the multifilament yarns of the present invention by the process of the present invention is for example the commercial copolyester (R) KODAR THERMX 13319 from Eastman Chemical Products Inc.

Preference is further given to yarns according to the present invention wherein, in the polyester of the above-indicated composition, from 85 to 100 mol % of the diol units are 1,4-cyclohexanedimethylene units, from 0 to 15 mol % of the diol units are ethylene glycol units and from 0 to 3 mol % of the diol units are longer-chain diol units.

Bivalent, ether group-containing radicals of the formula —(CH$_2$CHR-O)$_n$—CH$_2$CHR— are those which are derived from diglycol, triglycol or polyglycol having an average molecular weight from about 500 to 2000.

Examples of cycloaliphatic or aromatic radicals Q are 1,4-cyclohexanediyl, 1,3- or 1,4-phenylene and also -phenylene-O-phenylene-, -phenylene-S-phenylene- and -phenylene-SO$_2$-phenylene-.

Advantageously, the polyesters of the yarns according to the present invention have a specific viscosity from 0.8 to 1.7, preferably from 1.1 to 1.5, measured in a solution of 1 g of the polyester in 100 ml of dichloroacetic acid at 25° C.

Preferably, polyesters which contain structural units of the formula II contain from 70 to 99 mol %, in particular from 85 to 99 mol %, of structural units of the formula I and from 1 to 30 mol %, in particular from 1 to 15 mol %, of structural units of the formula II.

The aromatic radicals X can all be identical within the scope of the definition, or they can be different. More particularly, the abovementioned structural units represented by X, which account for at least 85 mol % of the polyester chain, can be present in the polyester chain individually or mixed. It is preferred for the at least 85 mol % of the polyester chain to be formed by only one or two species from the group of the radicals specified for these main components. A possibly desired further modification of the polyester chain is then preferably effected with other structural units within the scope of the definition given for the not more than 15 mol % of structural units represented by X.

For instance, the at least 85% by weight of aromatic radicals can all be 1,4-phenylene radicals, or they can be made up for example in a molar ratio from 80:20 to 95:5 from 1,4-phenylene and 1,3-phenylene or in a molar ratio from 4:6 to 6:4 from 2,6-naphthalene radicals and 4,4-biphenyldiyl radicals. Preference is given to polyesters in which X comprises at least 95 mol % of aromatic radicals and not more than 5 mol % of aliphatic radicals, but in particular to those in which X is exclusively aromatic radicals.

Similarly, the Y radicals can all be identical within the scope of the definition given, or they can be different. More particularly, the abovementioned structural groups Y, which account for up to 15 mol % of the polyester chain, can be present in the polyester chain individually or mixed. A possibly desired further modification of the polyester chain is then preferably effected by other structural units within the scope of the definition given for the up to 15 mol % of structural units Y. Particular preference is given to yarns according to the present invention composed of polyesters in which Y comprises at least 95 mol % of 1,4-cyclohexanedimethylene radicals.

Preferred aromatic radicals X and Q are 1,4- and 1,3phenylene, 1,4-, 1,5-, 1,8-, 2,6- and 2,7-naphthylene, 4,4-biphenylylene, furylene and radicals of the formula III where Z is polymethylene or alkylene having from 1 to 4 carbon atoms, —SO$_2$, —COO—, —O— or —S—.

The aromatic radicals X may in turn carry one or two substituents. In this case it is preferable, however, for only a proportion of up to 15%, in particular of up to 7%, of the aromatic radicals present to be substituted. Preferably the substituted aromatic radicals each carry only one substituent. Particularly suitable substituents are alkyl having 1 to 4 carbon atoms, alkoxy having 1 to 4 carbon atoms, chlorine and sulfo.

Radicals derived from aliphatic dicarboxylic acids and aromatic radicals yielding angled chains, for example isophthalic acid radicals, or containing the bulkier aromatic nuclei, such as the naphthalene nucleus, and also the longer-chain structural units Y are incorporated into the polyester chain in particular if it is desired to modify the properties of the polyester. Preference is given to yarns according to the present invention which are composed of polyesters which contain less than 7% of these modifying components.

Particular preference is given to yarns according to the present invention which are composed of polyesters which contain at least 85 mol % of 1,4-cyclohexanedimethylene terephthalate groups (formula V):

Preference is also given to yarns according to the present invention which are composed of polyesters which, in addition to structural units of the formula V, contain in the chain up to 10 mol % of other building blocks from the abovementioned groups and have as a result been modified so that certain performance characteristics are obtained, for example poly(1,4-cyclohexanedimethylene terephthalate) which, through incorporation of sulfo-containing units (e.g. sulfoisophthalic acid), has had conferred upon it an affinity for basic dyes.

In addition to the above-indicated modifiers, which are incorporated into the polyester chain, there are further known substances which may either be chemically reacted with the polyester or mixed into it. Examples of such additives are stabilizers, end group capping agents and inorganic substances, for example very finely divided silica, silicates, aluminum oxide or titanium dioxide. Typical end group capping agents, which are generally added to the polyester in amounts from 0.5 to 10% by weight, preferably from 1 to 4% by weight, include for example carbodiimides such as the homopolymer or 1,3,5tris(1-methylethyl)-2,4-diisocyanatobenzene or its copolymer with 2,6-diisopropylbenzene diisocyanate. A commercial end group capping agent of this kind is (R) STABAXOL P-100 from Rhein-Chemie. A typical stabilizer is for example distearyl thiodipropionate, which protects the polyester from thermal-oxidative degradation.

The present invention further provides a process for producing the above-described multifilament yarns of the present invention. In this process, a polyester based on poly(1,4-cyclohexanedimethylene terephthalate) of the above-indicated definitions is conventionally spun from the melt and the spun filaments are cooled down by quenching with air and taken off at a spinning take-off speed of below 1500 m/min. All the while the melt is held at a temperature of from 295° to 305° C. It is of particular importance for the production of the multifilament yarns of the present invention that the melt be spun at the stated temperature of from 295° to 305° C., which is only about 5° to 10° C. above the melting point of the poly(1,4-cyclohexanedimethylene terephthalate)-based copolyester used. It is very surprising that the best results are obtained at this spinning temperature, which is only relatively little above the melting point, since polyethylene terephthalate, for example, is usually spun at a temperature about 30° C. above its melting point.

The spun filaments are drawn continuously or batchwise, preferably by passing through two drawing stages.

The pre-draw is carried out at a temperature between 90° and 120° C. and with a high drawing tension (>2 cN/tex, based on the as-spun linear density) and accounts for more than 70% of the total draw. The second drawing stage is carried out at a temperature of above 240° C. and is used to set a draw ratio of >1:1.2.

To set the desired breaking extension and the required heat shrinkage, the drawing of the filaments according to the present invention may be followed by a setting and relaxing treatment at temperatures above 230° C. using a shrinkage ratio from 1:0.98 to 1:0.8 or a third drawing stage at temperatures above 230° C. using a draw ratio from 1:1.05 to 1:1.2.

It is particularly advantageous to control the spinning conditions, in particular the intensity of the cooling and the take-off speed, in such a way that the filament material obtained has a density of below 1.2 g/cm³. This produces a filament yarn which is virtually free of crystalline portions.

Particular preference is given to those poly(1,4-cyclohexanedimethylene terephthalate) multifilament yarns of the present invention and to those embodiments of the production process of the present invention which include a combination of a plurality of preferred features.

The examples which follow illustrate the production and the properties of poly(1,4-cyclohexanedimethylene terephthalate) multifilament yarns according to the present invention.

EXAMPLE 1

Chips of a commercially available copolyester based on poly(1,4-cyclohexanedimethylene terephthalate-co-isophthalate) ((R) KODAR THERMX 13319), having a specific viscosity of 1.459, measured in a 1% strength by weight solution in dichloroacetic acid at 25° C., and a carboxyl group content of 3.6 mmol/kg, are vacuum dried for 10 hours at 60°–160° C. and then melted at 290°–300° C. and fed via gear spinning pumps via a spin pack with sand and wire mesh filter to a spinneret with 200 orifices. The temperature of the melt is 298° C. The filaments emerging from the spinneret are cooled down by a transverse quench with 30° C. air, coalesced, spin-finished, and taken off and wound up at a speed of 740 m/min.

The as-spun linear density of the multifilament yarns thus obtained was 4620 dtex, their birefringence was $9.3 \times 10^{-3}$, their density, determined in a gradient column, was 1.1982 g/cm³, and the specific viscosity of the filament material, determined as indicated above, was 1.230. The multifilament yarns thus produced were then multi-stagedly drawn, the first stage being carried out at 100° C. and the second stage at 250° C. The draw ratio was set in the first stage to 1:3.2 and in the second stage to 1:1.35. The drawn yarns were then additionally heat-set at 230° C. while allowing a small amount of shrinkage (1:0.975). The multifilament yarn produced had the following properties:

Linear density: 1070 dtex

Tensile strength: 57.9 N

Tenacity: 54.1 cN/tex

Breaking extension: 10.5%

Hot air shrinkage at 200°C. ($S_{200}$): 9.4%

Specific viscosity of the fiber material (measured as indicated above): 1.225

Density: 1.2315 g/cm³

Carboxyl group content: 13.4 mmol/kg

EXAMPLES 2 to 5

Example 1 was repeated under varied conditions to produce multi filament yarns of the present invention from chip samples of a commercially available polyester based on poly(1,4cyclohexanedimethylene terephthalate-co-isophthalate) ((R) KODAR THERMX 13319), having the specific viscosities—measured in a 1% strength by weight solution in dichloroacetic acid at 25° C.—and the carboxyl group contents given in the following table.

The production conditions and the properties of the asspun filaments and of the ready-drawn and heat-set multifilament yarns according to the present invention are indicated in the table below. The abbreviation "SV" in the table below denotes "specific viscosity", which was measured as indicated above.

TABLE

| Condition/feature | Example 2 | Example 3 | Example 4 | Example 5 |
|---|---|---|---|---|
| Spinning | | | | |
| SV of chips | 1.459 | 1.459 | 1.459 | 1.461 |
| COOH content of chips | 3.6 | 3.6 | 3.6 | 3.3 |
| Spinning take-off speed [m/min] | 740 | 740 | 740 | 1000 |
| Birefringence of as-spun yarn | $9.3 \times 10^{-3}$ | $9.3 \times 10^{-3}$ | $9.3 \times 10^{-3}$ | $13.1 \times 10^{-3}$ |
| Density of as-spun yarn [g/cm$^3$] | 1.1982 | 1.1982 | 1.1982 | 1.1986 |
| SV of as-spun yarn | 1.230 | 1.230 | 1.230 | 1.255 |
| Drawing | | | | |
| Temperature stage 1 [°C.] | 100 | 100 | 100 | 100 |
| Draw ratio stage 1 | 1:3.2 | 1:3.2 | 1:3.2 | 1:2.88 |
| Temperature stage 2 [°C.] | 250 | 250 | 250 | 250 |
| Draw ratio stage 2 | 1:1.36 | 1:1.36 | 1:1.36 | 1:1.295 |
| Heat-setting | | | | |
| Heat-setting temperature [°C.] | 230 | 230 | 230 | 230 |
| Shrinkage ratio | 1:0.93 | 1:0.91 | 1:0.888 | 1:0.91 |
| Yarn data | | | | |
| Linear density [dtex] | 1118 | 1129 | 1153 | 1145 |
| Tensile strength [N] | 55.0 | 55.6 | 54.0 | 55.5 |
| Tenacity [cN/tex] | 49.2 | 49.3 | 46.9 | 48.5 |
| Breaking extension [%] | 13.9 | 16.3 | 18.9 | 16.7 |
| Dry heat shrinkage 200° C. | 5.8 | 3.9 | 2.1 | 3.3 |
| SV of yarn material | | 1.225 | | 1.229 |
| Birefringence of yarn material | $114 \times 10^{-3}$ | | | $110 \times 10^{-3}$ |
| Density of yarn material [g/cm$^3$] | 1.2315 | | | 1.2310 |
| COOH content of yarn material [mg/kg] | | 13.8 | | 11.8 |
| Knot strength [cN/tex] | | 23.4 | | |
| Loop strength [cN/tex] | | 32.8 | | |

What is claimed is:

1. A multifilament yarn composed of a polyester based on poly(1,4-cyclohexanedimethylene terephthalate), wherein at least 85 mol % of the diol-derived groups of the polyester are 1,4 cyclohexanedimethylene groups, said yarn having an original strength of above 40 cN/tex and either, (1) a post hydrolysis treatment strength of at least 85% of the original strength of above 40 cN/tex, or (2) a post aminolysis treatment strength of at least 85% of the original strength of above 40 cN/tex.

2. The multifilament yarn of claim 1, characterized by a tenacity of above 40 cN/tex and a dry heat shrinkage $S_{200}$ of below 10%.

3. The multifilament yarn of claim 1, characterized by a tenacity of above 45 cN/tex and a dry heat shrinkage $S_{200}$ of below 10%.

4. The multifilament yarn of claim 1, characterized by a tenacity of above 40 cN/tex and a dry heat shrinkage $S_{200}$ of below 5%.

5. The multifilament yarn of claim 1, characterized by a tenacity of above 45 cN/tex and a dry heat shrinkage $S_{200}$ of above 7%.

6. The multifilament yarn of claim 1, for which the relationship between the tenacity F of the yarn and its dry heat shrinkage $S_{200}$ is given by the equation (1):

$$F = K + 0.267 * S_{200} + 0.054 * S_{200}^2 \tag{1}$$

where the summand K is above 40, and $S_{200}$ is from 0 to 20.

7. The multifilament yarn of claim 1, wherein the polyester is composed of polymer chains containing from 85 to 100 mol % of groups of the formula I and from 15 to 0 mol % of groups of the formula II where

X comprises at least 85 mol % of aromatic radicals having from 5 to 16, carbon atoms and not more than 15 mol % of aliphatic radicals having from 4 to 10 carbon atoms, Y comprises at least 85 mol % of 1,4-cyclohexanedimethylene groups and not more than 15 mol % of straight-chain or branched alkanediyl having from 2 to 16, or radicals of the formula —(CH$_2$CHR-O)$_n$— CH$_2$CHR—, where R is methyl or hydrogen and n is an integer from 1 to 40, or radicals of the formula —(CH$_2$)$_9$—(Q)—(CH$_2$)$_9$—, where Q is O or S (an oxygen or sulfur atom), and q is an integer from 2 to 8, or Q is cycloalkanediyl or a unicyclic or bicyclic fused or unfused aromatic radical, or a radical of the formula III where Z is polymethylene or alkylene having from 1 to 4 carbon atoms, —SO$_2$—, —COO—, —O— or —S—.

8. The multifilament yarn of claim 1, wherein the polyester is exclusively composed of groups of the formula I in which from 90 to 100 mol %, of the radicals X are p-phenylene radicals and from 0 to 10 mol %, of the radicals X are m-phenylene radicals.

9. The multifilament yarn of claim 1, wherein, in the polyester, from 85 to 100 mol % of the diol units are 1,4-cyclohexanedimethylene units, from 0 to 15 mol % of the diol units are ethylene glycol units, and from 0 to 3 mol % of the diol units are longer-chain diol units.

10. The multifilament yarn of claim 1, wherein at least 85 mol % of the groups making up the polyester are 1,4-cyclohexanedimethylene terephthalate groups.

11. The multifilament yarn of claim 6 where the summand K is 44 to 49.

12. The multifilament yarn of claim 6 wherein $S_{200}$ is from 0 to 12.

13. The multifilament yarn of claim 7 wherein n=1 or 2 for proportions up to 15 mol %.

14. The multifilament yarn of claim 7 wherein n=10 to 40 for proportions below 5 mol %.

15. The multifilament yarn of claim 8 wherein the polyester is exclusively composed of groups of formula I in which from 95 to 100 mol % of the radicals X are p-phenylene radicals and from 0 to 5 mol % of the radicals X are m-phenylene radicals.

* * * * *

UNITED STATES PATENT AND TRADEMARK OFFICE
CERTIFICATE OF CORRECTION

PATENT NO. : 5,518,813
DATED : May 21, 1996
INVENTOR(S) : Gerhard Leumer

It is certified that error appears in the above-indentified patent and that said Letters Patent is hereby corrected as shown below:

Column 3, line 40, "135" should read -- 135°C --; and line 50, "Specific" should read -- specific.

Column 4, line 11 (in the formula), "$0.054S_{200}$" should read -- $0.054*S_{200}$ --; and line 37, "in" should read -- is --.

Column 10, line 11 (claim 5, line 2), "45" should read -- 50 --; and in line 43 (claim 7, line 5 above formula III), "$(CH_2)_9 - (Q) - (CH_2)_9$" should read -- $(CH_2)_q - (Q) - (CH_2)_q$ --.

Signed and Sealed this

Thirteenth Day of August, 1996

Attest:

BRUCE LEHMAN

*Attesting Officer*       *Commissioner of Patents and Trademarks*